(12) United States Patent
Lipp et al.

(10) Patent No.: US 8,941,343 B2
(45) Date of Patent: Jan. 27, 2015

(54) DRIVING CIRCUIT FOR AN EC-MOTOR

(75) Inventors: Helmut Lipp, Dörzbach-Hohebach (DE); Martin Bürkert, Dörzbach-Hohebach (DE); Christian Kranz, Weikersheim (DE); Daniel König, Gerabronn (DE)

(73) Assignee: EBM-Papst Mulfingen GmbH & Co. KG, Mulfingen (DE)

( * ) Notice: Subject to any disclaimer, the term of this patent is extended or adjusted under 35 U.S.C. 154(b) by 135 days.

(21) Appl. No.: 13/493,235

(22) Filed: Jun. 11, 2012

(65) Prior Publication Data

US 2012/0319632 A1   Dec. 20, 2012

(30) Foreign Application Priority Data

Jun. 16, 2011   (EP) ..................... 11170172

(51) Int. Cl.
| | |
|---|---|
| *H02P 6/14* | (2006.01) |
| *H02H 7/093* | (2006.01) |
| *H02P 6/12* | (2006.01) |
| *H02H 7/08* | (2006.01) |

(52) U.S. Cl.
CPC ............. *H02H 7/0844* (2013.01); *H02H 7/093* (2013.01)
USPC ............ 318/434; 318/280; 318/283; 318/469

(58) Field of Classification Search
None
See application file for complete search history.

(56) References Cited

U.S. PATENT DOCUMENTS

| | | | | |
|---|---|---|---|---|
| 4,532,567 | A | * | 7/1985 | Kade ................................ 361/31 |
| 4,887,013 | A | * | 12/1989 | Doth ............................ 318/489 |
| 6,696,804 | B1 | * | 2/2004 | Sutter et al. ............... 318/400.09 |
| 2003/0094913 | A1 | * | 5/2003 | Makaran et al. ................. 318/78 |
| 2005/0122074 | A1 | * | 6/2005 | Gerfast .......................... 318/254 |
| 2007/0024225 | A1 | * | 2/2007 | Hahn et al. .................... 318/434 |
| 2008/0258659 | A1 | * | 10/2008 | Dornhof ................... 318/400.25 |
| 2010/0219782 | A1 | * | 9/2010 | Zipser et al. ............. 318/400.26 |
| 2011/0084567 | A1 | * | 4/2011 | Ichiyama ...................... 310/181 |
| 2012/0194961 | A1 | * | 8/2012 | Yamada et al. ................ 361/152 |
| 2012/0213644 | A1 | * | 8/2012 | Phillips et al. .................... 417/1 |

FOREIGN PATENT DOCUMENTS

| | | |
|---|---|---|
| DE | 199 44 197 A1 | 3/2001 |
| DE | 102 61 452 A1 | 9/2004 |
| DE | 20 2004 020 586 U1 | 10/2005 |

OTHER PUBLICATIONS

European Search Report—Nov. 29, 2011.

\* cited by examiner

*Primary Examiner* — Eduardo Colon Santana
*Assistant Examiner* — Devon Joseph
(74) *Attorney, Agent, or Firm* — Brinks Gilson & Lione

(57) ABSTRACT

A control circuit (1) for an electronically commutated, direct current motor (M) without a collector with a semiconductor end stage (2) which is controlled by an electronic commutation control (4) via a driver stage (6) for the time-offset control of the stator coils (U,V,W) of the motor (M) for the purpose of producing a magnetic rotating field for a rotor depending on the rotor rotation position. Two redundant stall protection units (10, 12) monitor the motor (M) during operation for rotation of the rotor, whereby in the case of a determined stall situation, the first stall protection unit (10) deactivates the driver stage (6) and the second stall protection unit (12) shuts off the supply voltage ($U_{VCC}$) for the driver stage (6).

7 Claims, 1 Drawing Sheet

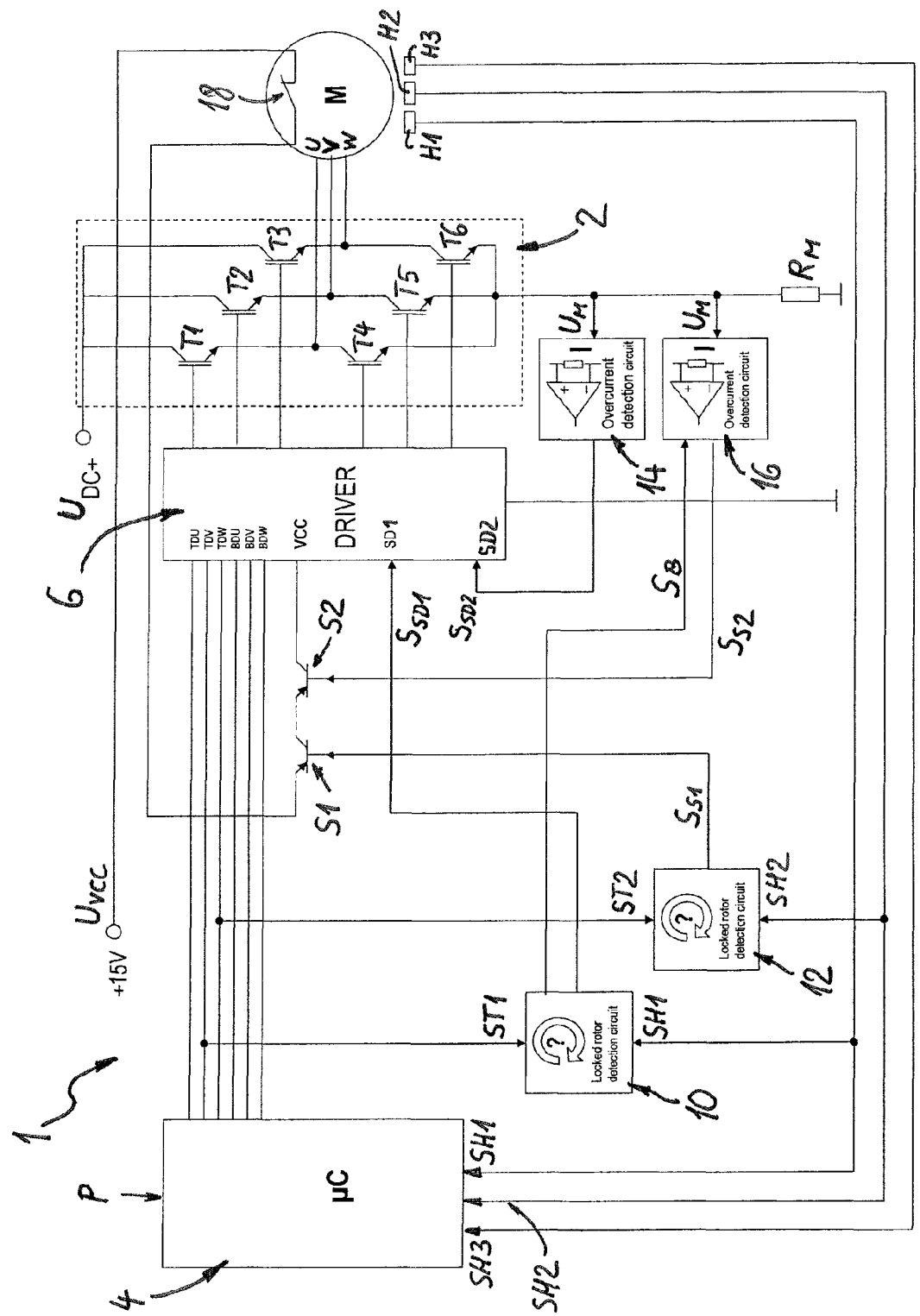

DRIVING CIRCUIT FOR AN EC-MOTOR

CROSS REFERENCE TO RELATED APPLICATION

This invention claims priority to European Patent Application No. 11170172.8, filed Jun. 16, 2011.

FIELD OF THE INVENTION

The present invention relates to a control circuit for a brushless, electronically commutated, direct current motor, i.e. for a so-called EC motor (EC=electronically commutated), frequently also called a BLDC motor (BLDC=brushless direct current) with a semiconductor end stage powered by a supply direct voltage which is controlled by an electronic commutation control via a driver stage for the time-offset control of the stator coils of the motor for the purpose of producing a magnetic rotating field for a rotor depending on the rotor rotation position.

BACKGROUND AND SUMMARY OF THE INVENTION

According to certain standard specifications, EC motors of the above-referenced type must be protected against overheating in the event of abnormal operating conditions.

To that end, it is known to place so-called temperature sensors inside the motor in the area of the stator coils, which as temperature-dependent switches, are triggered upon reaching a certain temperature limit and the operating current is usually directly or indirectly shut off by means of a trigger element. With certain motors, e.g., with external rotor motors, it is expensive both with regard to construction and manufacturing technology to house temperature sensors in or on the stator coil so that they can sense rapid temperature increases, as they can occur in particular with blockages (stalling) of the motor, and be able to safely shut off the motor.

It is further known how to design motors with impedance protection, i.e. to dimension the coil resistance and the wire diameter such that no overheating can occur during abnormal operation. A design with impedance protection is not possible in particular for EC motors with single tooth windings, however, because the winding resistances are very small.

Therefore up until now, a software controlled current limitation was integrated into the commutation control in which the software control specifies a lower threshold for the starting current and an upper threshold for the operating current. If the lower threshold is met or exceeded during the start-up phase, then the motor is shut off. However, if the motor runs normally, then a monitor of the operating current is commutated with regard to the upper threshold, and if the upper threshold is met or exceeded, the motor is shut off.

Such protective measures that can be implemented solely by software are not considered however by certain accreditation agencies, such as for example UL (Underwriters Laboratories), during the tests for the award of certain marks of approval.

The object of the present invention is to create a control circuit of the aforementioned type which guarantees an increased operational reliability for the prevention of motor overheating.

Accordingly the hardware design of the inventive control circuit comprises two redundant stall protection units which monitor the motor during operation, i.e., with the presence of driver signals for the driver stage upon the turning of the rotor, whereby in the case of a determined stoppage, the first stall protection unit deactivates the driver stage and the second stall protection unit shuts of the supply voltage for the driver stage.

By means of the inventive design, the sought-after high operational certainty is attained because, if the software current limitation control should fail for certain reasons, a secure shutting-off of the motor in an abnormal operating condition is guaranteed by at least one of the two redundant stall protection units.

Furthermore in another advantageous feature of the invention, two redundant, hardware designed, excess current protection units are provided which monitor the motor operating current, whereby in the event that the first current limiting value is exceeded, the first excess current protection unit deactivates the driver stage and in the event that the second current limiting value is exceeded, the second excess current protection unit shuts off the supply voltage for the driver stage. It should be preferably provided in an adaptation to the implied software current limitation in the commutation control that the first current limiting value of the first excess current protection unit is slightly greater than an upper threshold value of the software current limitation for the operating current, while the second current limiting value of the second excess current protection unit is slightly greater than a lower threshold of the software current limitation for the start-up current. In this way, if the electronic software current limitation should fail, shut-off occurs during start-up at the latest upon reaching or exceeding the second current limiting value, and during operation, at the latest upon the reaching or exceeding the first current limiting value. To that end, the second excess current protection unit in operation is deactivated during a determined cycle of the motor, and indeed preferably via an operating signal of one of the two inventive stall protection units.

In the following the invention will be explained more in detail using a preferred embodiment.

BRIEF DESCRIPTION OF THE DRAWING

The SOLE drawing FIG. 1 shows a block diagram of an inventive control circuit.

DETAILED DESCRIPTION OF THE INVENTION

Reference is expressly made to the following specification that all described individual features can be used in any desired combination with each other and indeed independent of referrals back to the claims. Furthermore only features recognizable in the drawing have an inventive significance without any separate description and, to be sure, even in any desired combination with other properties.

An inventive control circuit 1 serves to operate an electronically commutated direct current motor M without collectors, as it is known under the concepts EC motor or BLDC motor. In the embodiment depicted, the motor M is constructed in three phases with three stator coils which are designated arbitrarily in the FIGURE as U, V, and W and are connected in particular in a star circuit. A triangular 3-phase circuit is, however, also absolutely possible. The control circuit 1 has a semiconductor end stage 2 which is supplied by direct voltage $U_{DC}$ and is controlled by an electronic commutation control 4 via a driver stage 6 for a time-offset control of motor M's stator coils for the purpose of producing a rotating magnetic field for its rotor dependent upon the rotor rotation position. For the three-phase motor design, the end stage 2 is constructed as a rotary-current-full-bridge with six controlled semiconductor switch elements, T1 to T6. The switch elements T1 to T3 of the "upper" bridge branch are also designated as high side switches, and the switch elements T4 to T6 of the "lower" bridge branch as low side switches. The switch elements T1 to T6 are controlled in pairs in successively differing combinations by the commutation control 4 via the driver stage 6. To that end, depending on the rotor rotation position signals SH1 to SH3, the commutation control 4 generates driver signals for the driver stage 6, which in turn generate corresponding control signals for the switch elements T1 to T6. Regulation and/or adjustment of the engine speed of the motor M can occur also by means of this control, and in particular by the PWM (pulse width modulation) cycling of the high side switch elements T1 to T3. Certain control parameters P can be supplied externally to the commutation control 4.

The details of such a motor control are known, so no further explanations are needed.

The acquisition of the rotor rotation position to produce the rotation position signals SH1 to SH3 can occur in any desired manner, for example by sensors as depicted, in particular, Hall sensors H1, H2, H3 in motor M, or also without sensors by means of the evaluation of the motor-EMK. The commutation control 4 can be formed by a microprocessor or a micro-controller μC with suitable, customary peripherals.

Two redundant stall protection units 10 and 12 are now inventively integrated in the control circuit 1 as hardware which monitor the motor M during operation, i.e. for rotation of the rotor with the presence of driver signals for the driver stage 6, whereby in the event of a stoppage determined by monitoring of the rotation position signals or a stalling of the rotor, the first stall protection unit 10 deactivates the driver stage 6 and the second stall protection unit 12 shuts off the supply voltage $U_{VCC}$ for the driver stage 6.

Two input signals are supplied to each of the two stall protection units 10 and 12. On the one hand, commutation control 4's driver signal and preferably a high side driver signal ST1 or ST2 in particular, and on the other hand, a rotor rotation position signal SH1 or SH2 of the rotation position acquisition device H1 to H3. It is advantageous for higher reliability to supply two different driver signals ST1, ST2 as well as two different rotation position signals SH1, SH2 to the two stall protection devices 10 and 12. When the high side driver signals are monitored, it can be recognized based on the pulsing, whether the motor M is in commutation operation instead of in brake or pre-load operation. A motor rotation must be determined within a predetermined timeframe by means of a change of the rotation position signal. If the motor M does not operate because of a stall for example, then no change of the rotation position signal appears. As a result, the stall protection units 10 and 12 release independently from each other and quickly and securely shut off the end stage 2 via the driver stage 6. Two-fold security to prevent rapid temperature increases is thereby guaranteed.

To deactivate the driver stage 6, the first stall protection unit 10 provides a control signal $S_{SD1}$ to a shut-off input SD1 (SD=shut down) of the driver stage 6. The second stall protection unit 12 shuts off the driver supply voltage $U_{VCC}$ via a switch element S1 upstream from the voltage supply input VCC of the driver stage 6 and indeed via a control signal $S_{S1}$.

In another advantageous embodiment of the invention, two redundant excess current protection units 14 and 16 that monitor the motor operating current are additionally integrated as hardware to protect the end stage 2 from overheating in the control circuit 1. In addition, a measuring voltage $U_M$ is supplied as an input signal to a measurement resistance $R_M$ located in series with the end stage 2. This measuring voltage $U_M$ representing the respective operating current is compared with a predetermined current limiting value. The first excess current protection unit 14 deactivates the driver stage 6 in the event of an exceeding of a first current limiting value. The second excess current protection unit 16 shuts off the supply voltage $U_{VCC}$ for the driver stage 6 in the event of an exceeding of a second current limiting value.

As already explained at the outset, a customary software current limitation is integrated into the control circuit 1 which is preset as an upper threshold value for the operating current and a lower threshold value for the start-up current. Upon the attainment or exceeding this threshold value the control is shut-off by software.

Additional security is achieved by means of additional excess current protection units 14 and 16. The first current limiting value of the first excess current protection unit 14 is preset with a slightly larger value as the upper threshold of the software current limitation for the operating current, while the second current limiting value of the second excess current protection unit 16 is slightly larger than the lower threshold value for the software current limitation for the start-up current. In an actual embodiment, the upper threshold of the software current limitation amounts, for example, to 12.0 amp, while the lower threshold value for the start-up current lies, for example, at 8.1 amp. In the process, the first current limiting value of the first excess current protection unit 14 lies above the upper threshold value by about 0.7 amp, namely at 12.7 amp. The second current limiting value of the second excess current protection unit 16 can likewise lie about 0.7 amp above the lower threshold value for the start-up current; namely, 8.8 amp. Attained as a result is that in the event of a failure of the software current limitation in an abnormal operating condition it can still reliably be shut off, specifically during the start-up phase upon the attainment or exceeding of the second current limiting value and during operation upon the attainment or exceeding of the first current limiting value.

The second excess current protection unit 16 is deactivated during operation at the determined cycle of the motor M. This can occur via an operating signal $S_B$ of one of the stall protection units 10 or 12, in the depicted example of the first stall protection unit 10. This prevents several current limitations from becoming effective during operation.

The first excess current protection unit 14 deactivates the driver stage 6 in that it sends a control signal $S_{SD2}$ to another shut-off input SD2 of the driver stage 6. The second excess current protection unit 16 shuts off the driver supply voltage $U_{VCC}$ of the switch element S2 upstream from the driver stage 6. As a result, both switch elements S1 and S2 lie in series in front of the voltage supply input VCC. The excess current protection unit 16 generates a control signal $S_{S2}$ for the switch element S2 to cause the shut off.

One customary temperature monitor 18 is placed inside the motor M in combination with the inventive measures, whereby the driver supply voltage $U_{VCC}$ is supplied via this temperature monitor 18. As a result, the temperature monitor 18 lies in series with the switch elements S1 and S2 in the supply line for the supply voltage $U_{VCC}$ which, for example, can amount to 15 V. By means of this design the temperature monitor 18 only needs a slight control current of several mAmp to perform the switching, instead of the full load current, and can therefore be designed small and low in cost. Functionally, the temperature monitor 18 positioned in a stator slot is effective in the event of a slowly increasing coil temperature.

It should still be mentioned that the supply direct voltage $U_{DC}$ is obtained preferably by a rectification of a network alternating current. The voltage is therefore often designated as a direct current link voltage.

The invention is not limited to the depicted and described embodiment examples but instead comprises all equally acting embodiments in the sense of the invention. It is expressly emphasized that the embodiment examples are not limited to all the features in combination, but instead each individual partial feature separated from all the other partial features can have an inventive significance for itself.

The invention claimed is:

1. A control circuit (1) for an electronically commutated brushless direct current motor (M) comprising:
   a semiconductor end stage (2) which is controlled by an electronic commutation control (4) via a driver stage (6) for the time-offset control of stator coils (U,V,W) of the motor (M) for the purpose of producing a magnetic rotating field for a motor rotor depending on the rotor rotation position, wherein a supply voltage ($U_{VCC}$) is supplied to a voltage supply input (VCC) of the driver stage (6) via a temperature monitor (18) placed inside the motor (M) in series in a supply line of the supply voltage of the driver stage (6),
   two redundant first and second excess current protection units (14, 16) which monitor the motor operating current,
   a measurement resistance RM arranged in series with the end stage (2) to provide an input signal for the first and second excess current protection units, and
   first and second redundant stall protection units (10, 12) which each monitor the motor (M) during operation for rotation of the rotor, wherein in the event of a determined stall status the first stall protection unit (10) deactivates the driver stage (6) and the second stall protection unit (12) shuts off the supply voltage ($U_{VCC}$) for the driver stage (6);
   wherein two input signals are supplied to each of the first and second stall protection units (10, 12), including a driver signal (ST1/ST2) of the commutation control (4), and a rotor rotation position signal (SH1/SH2) from a rotation position acquisition device (H1 to H3),
   wherein further the first stall protection unit (10) is configured to deactivate the driver stage (6) by sending a control signal ($S_{SD1}$) to a switch input (SD1) of the driver stage (6),
   wherein a first current limiting value of the first excess current protection unit (14) is greater than an upper threshold value of a software current limitation for the operating current, while a second current limiting value of the second excess current protection unit (16) is greater than a lower threshold value of the software current limitation for a start-up current.

2. The control circuit according to claim 1, further comprising two different of the driver signals (ST1, ST2), as well as two different of the rotation position signals (SH1, SH2) are supplied to the first and second stall protection units (10, 12).

3. The control circuit according to claim 1 further comprising the second stall protection unit (12) shuts off the driver supply current ($U_{VCC}$) via a switch element (S1) upstream from a voltage supply input (VCC) of the driver stage (6).

4. The control circuit according to claim 1 further comprising the second excess current protection unit (16) is deactivated during operation at a determined cycle of the motor (M), via an operating signal ($S_B$) of one of the first and second stall protection units (10, 12).

5. The control circuit according to claim 1 further comprising the first excess current protection unit (14) deactivates the driver stage (6) by sending a control signal ($S_{SD2}$) to a shut-off input (SD2) of the driver stage (6).

6. The control circuit according to claim 1 further comprising the second excess current protection unit (16) shuts off the driver supply voltage ($U_{VCC}$) via a switch element (S2) upstream from the voltage supply input (VCC) of the driver stage (6).

7. The control circuit according to claim 1 further comprising the motor in the form of a three-phase motor (M) with three stator coils (U,V,W) connected in a star or a triangle circuit, whereby the semiconductor end stage (2) is constructed as a full bridge with six switch elements (T1 to T6) which are controlled in pairs in successively differing combinations via the driver stage (6).

* * * * *